(12) United States Patent
Norman et al.

(10) Patent No.: US 11,501,011 B2
(45) Date of Patent: Nov. 15, 2022

(54) METHOD FOR DEFINING POLICY ACROSS INFORMATION MODEL EXPOSED VIA AN APPLICATION PROGRAMMING INTERFACE

(71) Applicant: JPMorgan Chase Bank, N.A., New York, NY (US)

(72) Inventors: Michael George Norman, Edinburgh (GB); David Laurance, Dobbs Ferry, NY (US); Neil Antony Salter, Glasgow (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 190 days.

(21) Appl. No.: 16/910,479

(22) Filed: Jun. 24, 2020

(65) Prior Publication Data
US 2020/0410125 A1 Dec. 31, 2020

Related U.S. Application Data

(60) Provisional application No. 62/866,293, filed on Jun. 25, 2019.

(51) Int. Cl.
*G06F 21/62* (2013.01)
(52) U.S. Cl.
CPC ................ *G06F 21/6218* (2013.01)
(58) Field of Classification Search
None
See application file for complete search history.

(56) References Cited

U.S. PATENT DOCUMENTS

| 6,804,686 | B1 | 10/2004 | Stone et al. | |
| 10,620,924 | B2* | 4/2020 | Stojanovic | G06F 16/211 |
| 2008/0228697 | A1* | 9/2008 | Adya | G06F 16/212 |
| 2010/0145946 | A1 | 6/2010 | Conrad et al. | |
| 2014/0052749 | A1 | 2/2014 | Rissanen | |

OTHER PUBLICATIONS

International Search Report and Written Opinion of the International Searching Authority in corresponding International Application No. PCT/US20/39343, dated Sep. 4, 2020.

* cited by examiner

*Primary Examiner* — Brandon Hoffman
(74) *Attorney, Agent, or Firm* — Greenblum & Bernstein, P.L.C.

(57) ABSTRACT

A method for defining a policy for providing access to a system is provided. The method includes: identifying, for each of a plurality of information classes within an information model, at least one respective information attribute; defining, for at least one of the at least one respective information attribute, a respective predicate filter function; determining, based on the defined at least one respective predicate filter function, at least one access rule that relates to a corresponding information attribute; defining the policy with respect to each of the plurality of information classes based on the constructed API and each of the determined at least one access rule; and constructing an application programming interface (API) for the information model based on the defined policy. The API may be augmented by updating parameters based on the defined policy.

18 Claims, 7 Drawing Sheets

700

| Class | attributes |
|---|---|
| Country | Country.id<br>Country.name<br>Country.Hotels.name<br>Country.Hotels.id<br>Country.Hotels.Bookings.id<br>Country.Hotels.Bookings.startDate<br>Country.Hotels.Bookings.endDate<br>Country.Hotels.Employees.name<br>Country.Hotels.Employees.id |
| Hotel | Hotel.Name<br>Hotel.id<br>Hotel.Country.name<br>Hotel.Country.id<br>Hotel.Employees.name<br>Hotel.Employees.id<br>Hotel.Bookings.id<br>Hotel.Bookings.startDate<br>Hotel.Bookings.endDate |
| Booking | Booking.id<br>Booking.startDate<br>Booking.endDate<br>Booking.Hotel.name<br>Booking.Hotel.id<br>Booking.Hotel.Country.name<br>Booking.Hotel.Country.id<br>Booking.Hotel.Employees.name<br>Booking.Hotel.Employees.name |
| Employee | Employee.name<br>Employee.id<br>Employee.Hotel.name<br>Employee.Hotel.id<br>Employee.Hotel.Country.name<br>Employee.Hotel.Country.id<br>Employee.Hotel.Bookings.id<br>Employee.Hotel.Bookings.startDate<br>Employee.Hotel.Bookings.endDate |

FIG. 7

METHOD FOR DEFINING POLICY ACROSS INFORMATION MODEL EXPOSED VIA AN APPLICATION PROGRAMMING INTERFACE

CROSS-REFERENCE TO RELATED APPLICATIONS

This application claims the benefit of U.S. Provisional Patent Application Ser. No. 62/866,293, filed Jun. 25, 2019, which is hereby incorporated by reference in its entirety.

BACKGROUND

1. Field of the Disclosure

This technology generally relates to methods and systems for controlling access to information, and more particularly, to methods and systems for augmenting an application programming interface specification with appropriate parameters to support a policy for controlling functional access and data access to information resources.

2. Background Information

Access to a system is controlled by a policy. In many conventional systems, a policy generally requires an access determination to be governed by rules which are defined based on attributes of a respective actor, the resources to be accessed, the action or function to be performed, and contextual factors, such as a time of day.

Historically, policy has been implemented within a boundary of a conventional system. However, there is a shortcoming with respect to an ability to implement a policy that references attributes in systems that are outside of the system to which the policy is directly applicable. Further, there is an additional shortcoming with respect to defining a coherent policy that applies to an enterprise that addresses access issues with respect to multiple systems.

Accordingly, there is a need to define and express a policy that has well-defined semantics both within the applicable system and with respect to attributes that are external to the applicable system. There is also a need to support external evaluation, analysis, and audit with respect to such a policy.

The above shortcomings have been addressed by the introduction of an architecture for externalized authorization—as embodied, for example, in the eXtensible Access Control Markup Language (XACML). Here, the Access Request is enriched with attributes from multiple Policy Information Points before being evaluated against authorization policies by a Policy Decision Point and enforced by a Policy Enforcement Point.

Conventional externalized policy architectures are deficient in an important respect when applied to commonly-used API patterns such as REST. In many cases, the API is not a request for a single resource but for a Collection of resources, and the access decision is not to determine whether the API request itself is allowed, but to determine which elements of the Collection are allowed to be accessed. Conventional externalized policy architectures deal with the problem of Access Requests to Collections through an Obligation—i.e., access is allowed subject to a set of conditions, which must be understood and honored by the Policy Enforcement Point.

Conventional approaches are deficient in one important respect, which may be seen in comparing an Access Request to read a single resource, versus an Access Request to the same resource within a Collection. In the first case, access to the resource is determined inside the Policy Decision Point by evaluating the Policy. In the second case, the access to the resource is determined by the Policy Enforcement Point evaluating the Obligation. The Obligation and the Policy are making the same choice, but in conventional approaches, they are treated as being two different things, and there is no way of converting a Policy into an Obligation and vice-versa.

SUMMARY

The present disclosure, through one or more of its various aspects, embodiments, and/or specific features or sub-components, provides, inter alia, various systems, servers, devices, methods, media, programs, and platforms for defining a policy for controlling access to a system. According to an exemplary embodiment, the method includes: identifying, for each of a plurality of information classes within an information model, at least one respective information attribute; defining, for at least one of the at least one respective information attribute, a respective predicate filter function; determining, based on the defined at least one respective predicate filter function, at least one access rule that relates to a corresponding information attribute; defining the policy with respect to each of the plurality of information classes based on each of the determined at least one access rule; and constructing an application programming interface (API) for the information model based on the defined policy.

The API allows access to a collection of instances of each of the plurality of information classes. In this aspect, the method may further include: augmenting the API with appropriate parameters for an API-specific predicate that correctly supports the policy; issuing at least one request to access a collection of instances via the API; introducing the predicate filter function into the parameters of the API request before passing it to the system; and evaluating the augmented API request inside the system, thereby performing an action in conformance with the policy.

The determination of the at least one access rule may include combining at least two of the at least one respective predicate filter function into a single compound filter for the corresponding information attribute, and determining the at least one access rule based on the single compound filter.

The method may further include augmenting the first API by updating at least one filter function based on the defined policy.

The method may further include: intercepting a first API call against the first system that relates to the information model; constructing, based on the intercepted first API call, a second API call that includes the defined policy; and executing the second API call.

Each of the least one respective information attribute may include data that has a respective data type selected from among a plurality of data types that includes a text string type, a numeric type, and a date type.

The at least one access rule may include at least one from among a data access rule that relates to an ability of a first party to access first data from within the first system and a functional access rule that relates to an ability of the first party to perform a first operation with respect to the first data.

The constructing of the first API may include using a Representational State Transfer (REST) architecture that includes a mapping between each of a plurality of elements included in the first API and at least one corresponding class of the plurality of information classes included in the information model.

The method may further include modifying at least a second API for a second system that relates to the information model by applying the defined policy to the at least second API.

The method may further include: receiving, from a user, an input that relates to the defined policy; adjusting the defined policy based on the received input; and modifying each of the first API and the at least second API based on the adjusted policy.

The method may further include expressing the information model as a Unified Modeling Language (UML) diagram that is displayable on a display.

According to another exemplary embodiment, a computing apparatus for defining a policy for controlling access to a system is provided. The computing apparatus includes a processor, a memory, and a communication interface coupled to each of the processor and the memory. The processor is configured to: identify, for each of a plurality of information classes within an information model, at least one respective information attribute; define, for at least one of the at least one respective information attribute, a respective predicate filter function; determine, based on the defined at least one respective predicate filter function, at least one access rule that relates to a corresponding information attribute; define the policy with respect to each of the plurality of information classes based on each of the determined at least one access rule; and construct a first application programming interface (API) for a first system that relates to the information model based on the defined policy.

The processor may be further configured to combine at least two of the at least one respective predicate filter function into a single compound filter for the corresponding information attribute, and to determine the at least one access rule based on the single compound filter.

The processor may be further configured to augment the first API by updating at least one filter function based on the defined policy.

The processor may be further configured to: intercept a first API call against the first system that relates to the information model; construct, based on the intercepted first API call, a second API call that includes the defined policy; and execute the second API call.

Each of the least one respective information attribute may include data that has a respective data type selected from among a plurality of data types that includes a text string type, a numeric type, and a date type.

The at least one access rule may include at least one from among a data access rule that relates to an ability of a first party to access first data from within the first system and a functional access rule that relates to an ability of the first party to perform a first operation with respect to the first data.

The processor may be further configured to construct the first API by using a Representational State Transfer (REST) architecture that includes a mapping between each of a plurality of elements included in the first API and at least one corresponding class of the plurality of information classes included in the information model.

The processor may be further configured to modify at least a second API for a second system that relates to the information model by applying the defined policy to the at least second API.

The processor may be further configured to: receive, from a user via the communication interface, an input that relates to the defined policy; adjust the defined policy based on the received input; and modify each of the first API and the at least second API based on the adjusted policy.

The processor may be further configured to express the information model as a Unified Modeling Language (UML) diagram that is displayable on a display.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 7 is a table of information classes and attributes that corresponds to the information model of FIG. 5, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
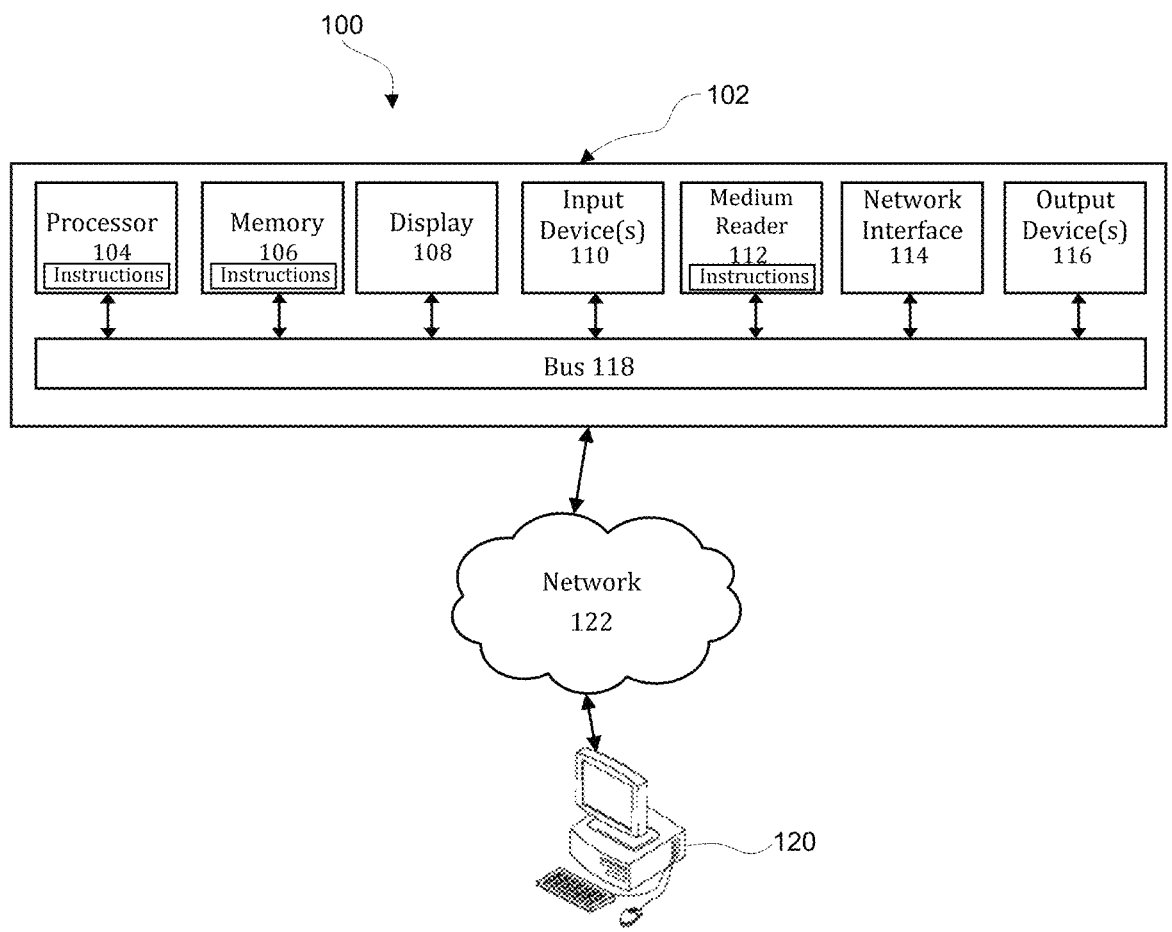
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for defining a policy for controlling access to a system.

Figure 2:
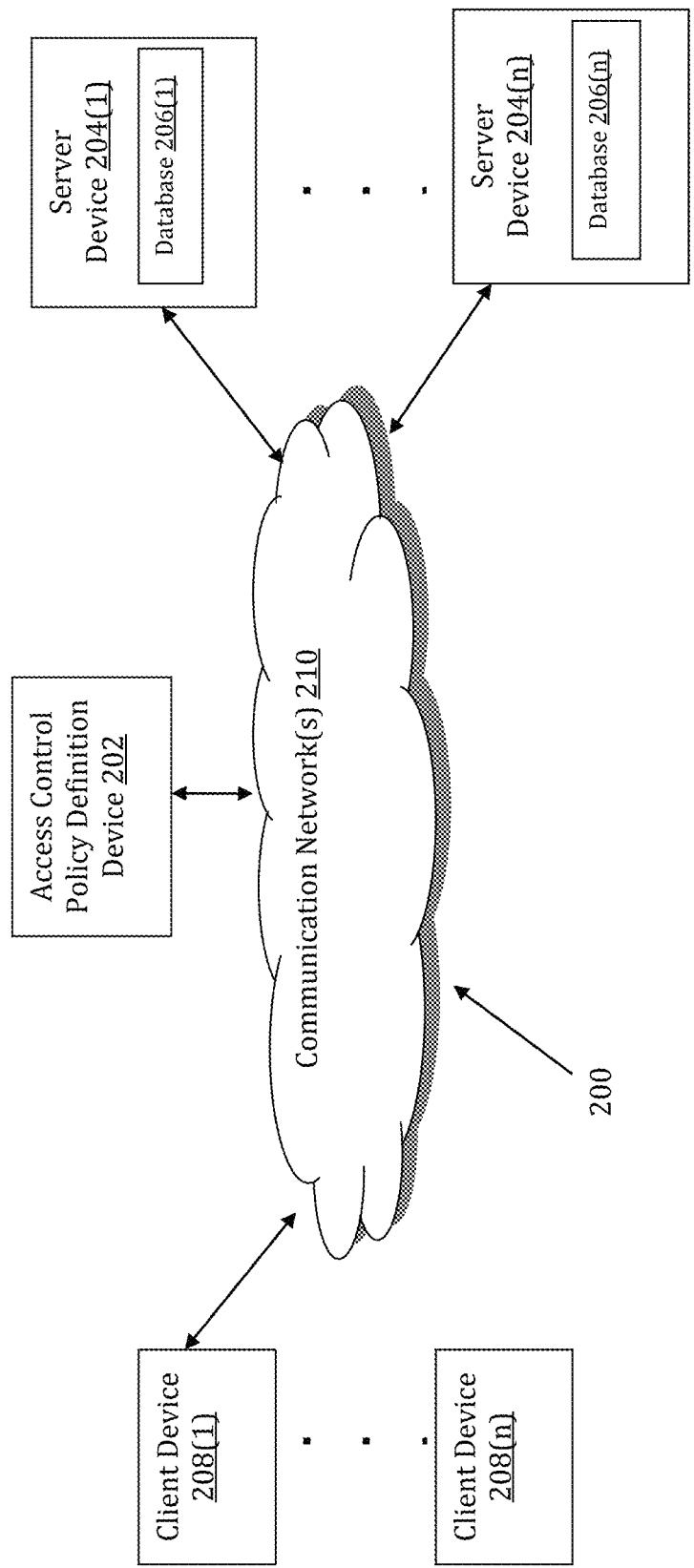
FIG. 2 illustrates an exemplary diagram of a network environment.

Referring to FIG. 2, a schematic of an exemplary network environment 200 for implementing a method for defining a policy for controlling access to a system is illustrated. In an exemplary embodiment, the method is executable on any networked computer platform, such as, for example, a personal computer (PC).

The method for controlling access to a system may be implemented by a Access Control Policy Definition (ACPD) device 202. The ACPD device 202 may be the same or similar to the computer system 102 as described with respect to FIG. 1. The ACPD device 202 may store one or more applications that can include executable instructions that, when executed by the ACPD device 202, cause the ACPD device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ACPD device 202 itself, may be located in virtual server(s) running in a cloud-based computing environment rather than being tied to one or more specific physical network computing devices. Also, the application(s) may be running in one or more virtual machines (VMs) executing on the ACPD device 202. Additionally, in one or more embodiments of this technology, virtual machine(s) running on the ACPD device 202 may be managed or supervised by a hypervisor.

In the network environment 200 of FIG. 2, the ACPD device 202 is coupled to a plurality of server devices 204(1)-204(n) that hosts a plurality of databases 206(1)-206(n), and also to a plurality of client devices 208(1)-208(n) via communication network(s) 210. A communication interface of the ACPD device 202, such as the network interface 114 of the computer system 102 of FIG. 1, operatively couples and communicates between the ACPD device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ACPD device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ACPD devices that efficiently implement a method for defining a policy for controlling access to a system.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ACPD device 202 may be a standalone device or integrated with one or more other devices or apparatuses, such as one or more of the server devices 204(1)-204 (n), for example. In one particular example, the ACPD device 202 may include or be hosted by one of the server devices 204(1)-204(n), and other arrangements are also possible. Moreover, one or more of the devices of the ACPD device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204

(n) may include, among other features, one or more processors, a memory, and a communication interface, which are coupled together by a bus or other communication link, although other numbers and/or types of network devices may be used. The server devices 204(1)-204(n) in this example may process requests received from the ACPD device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store information models that describe classes of information and relationships between the information classes for systems and domains of data, and policies and access control rules, which include data access rules that relate to exposure of particular data types to particular entities, functional access rules that relate to an ability to perform particular functions on particular data types, and governing principles that are reflected by the data access rules and functional access rules.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ACPD device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ACPD device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ACPD device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ACPD device 202, the server devices 204(1)-204(n), or the client devices 208(1)-208(n), for example, may be configured to operate as virtual instances on the same physical machine. In other words, one or more of the ACPD device 202, the server devices 204(1)-204(n), or the client devices 208(1)-208(n) may operate on the same physical device rather than as separate devices communicating through communication network(s) 210. Additionally, there may be more or fewer ACPD devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
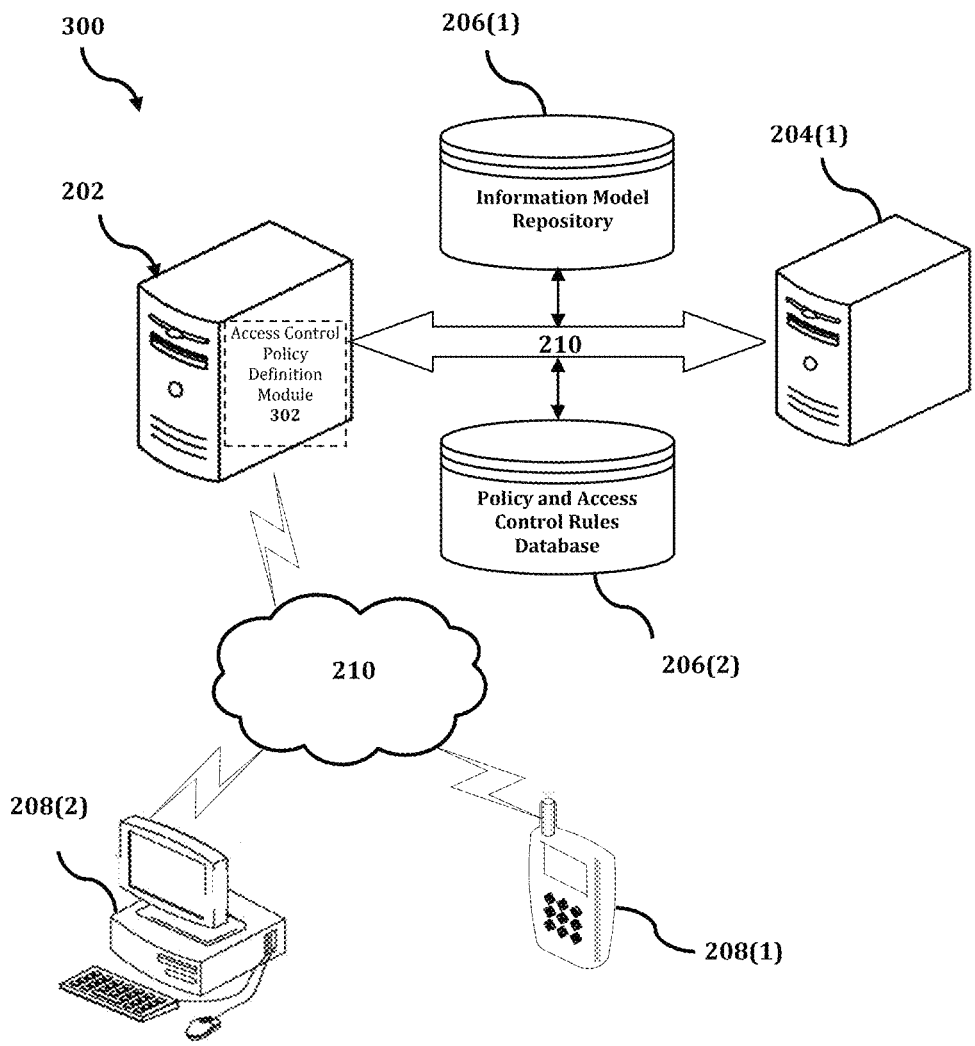
FIG. 3 shows an exemplary system for implementing a method for defining a policy for controlling access to a system.

The ACPD device 202 is described and shown in FIG. 3 as including a access control policy definition module 302, although it may include other rules, policies, modules, databases, or applications, for example. As will be described below, the access control policy definition module 302 is configured to implement a method for defining a policy for controlling access to a system in an automated, efficient, scalable, and reliable manner.

An exemplary process 300 for implementing a mechanism for defining a policy for controlling access to a system by utilizing the network environment of FIG. 2 is shown as being executed in FIG. 3. Specifically, a first client device 208(1) and a second client device 208(2) are illustrated as being in communication with ACPD device 202. In this regard, the first client device 208(1) and the second client device 208(2) may be "clients" of the ACPD device 202 and are described herein as such. Nevertheless, it is to be known and understood that the first client device 208(1) and/or the second client device 208(2) need not necessarily be "clients" of the ACPD device 202, or any entity described in association therewith herein. Any additional or alternative relationship may exist between either or both of the first client device 208(1) and the second client device 208(2) and the ACPD device 202, or no relationship may exist.

Further, ACPD device 202 is illustrated as being able to access an information model repository 206(1) and a policy and access control rules database 206(2). The access control policy definition module 302 may be configured to access these databases for implementing a method for defining a policy for controlling access to a system.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ACPD device 202 via broadband or cellular communication. Of course, these embodiments are merely exemplary and are not limiting or exhaustive.

Upon being started, the access control policy definition module 302 executes a process for defining a policy for controlling access to a system. An exemplary process for defining a policy for controlling access to a system is generally indicated at flowchart 400 in FIG. 4.

Figure 4:
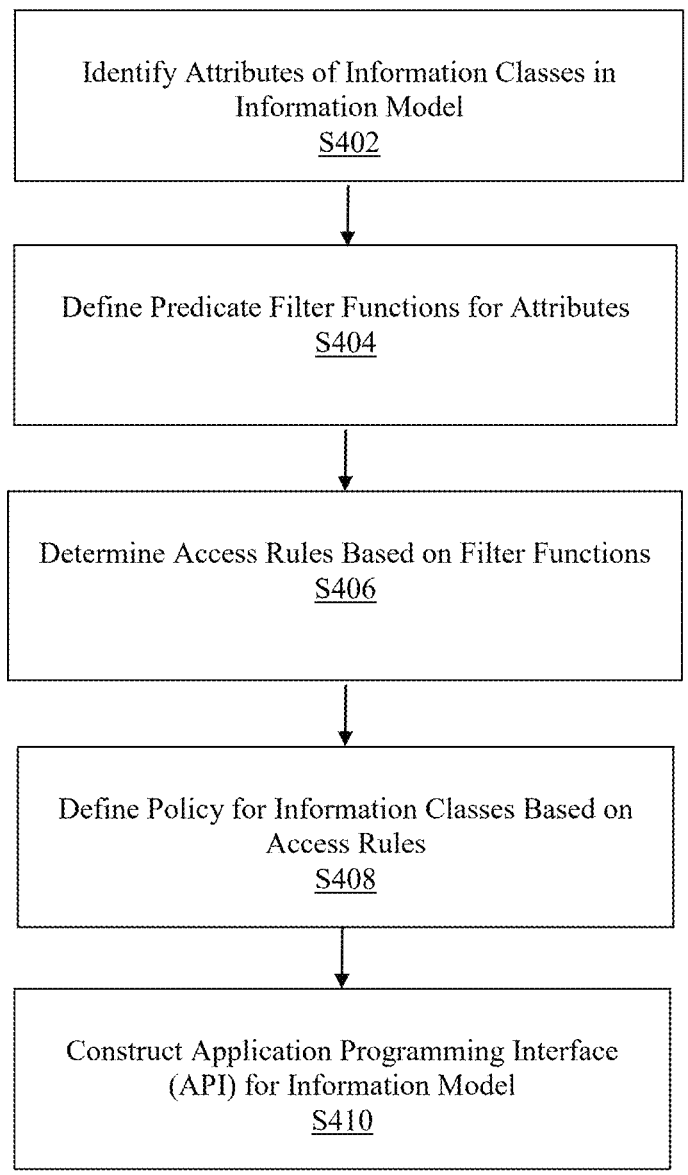
FIG. 4 is a flowchart of an exemplary process for implementing a method for defining a policy for controlling access to a system.

In the process 400 of FIG. 4, at step S402, attributes of information classes in an information model for a system are identified. In an exemplary embodiment, the information model is expressed in a variant of Unified Modeling Language (UML), and classes represent key concepts within a domain of the system. Each class includes one or more properties, which are primitive information elements that are of a particular type, such as a text string, a numeric type, or a date type, and which may be null. In an exemplary embodiment, each class includes one attribute of type string which is a globally unique identifier (GUID) whose value is unique to an instance of the class. The information model may be illustrated as a directed graph of classes that includes arcs, such that each respective arc traverses from a parent class to a child class. In this regard, each child class belongs to a parent class, and each parent class may have more than one child class. There is no requirement for the graph of classes to be connected. Further, a parent class may be the same as a child class, thereby allowing for a representation of hierarchical structures of instances. In an exemplary embodiment, if there is a many-to-many relationship between a first class and a second class, a third class which is an explicit intermediate class is required, and there are two arcs, such that the first class has many of the third class, and the second class also has many of the third class.

Figure 5:
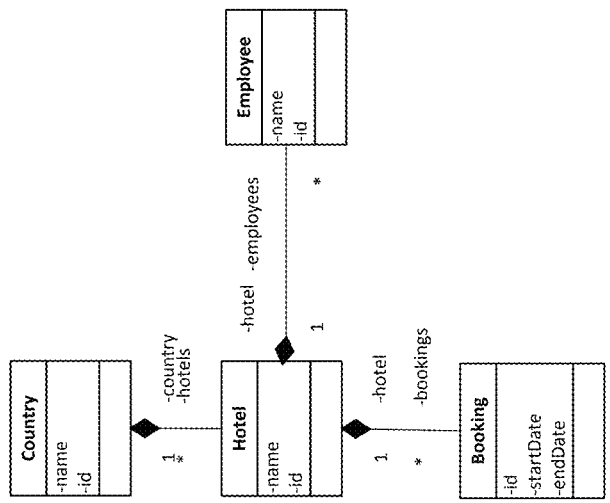
FIG. 5 is a diagram of an information model, according to an exemplary embodiment.

Referring to FIG. 5, an example of a UML diagram of an information model is illustrated. In the example of FIG. 5, the information model is based on a hotel booking system, and the model includes four classes: "Country", "Hotel", "Booking", and "Employee". As illustrated in FIG. 5, Booking is a child class of parent class Hotel; conversely, the Hotel has many Bookings. Similarly, Employee is a child class of parent class Hotel, and conversely, the Hotel has many employees. Hotel is a child class of parent class Country, and conversely, Country has many Hotels. In addition, each class includes one or more properties: Country has a "name" property, which is of text string type; Hotel also has a "name" property, which is also of text string type; Employee also has a "name" property, which is also of text string type; and Booking has three properties, i.e., "id", which refers to an identification number and is of numeric type; "startDate", which is of date type; and "endDate", which is also of date type.

Figure 6:
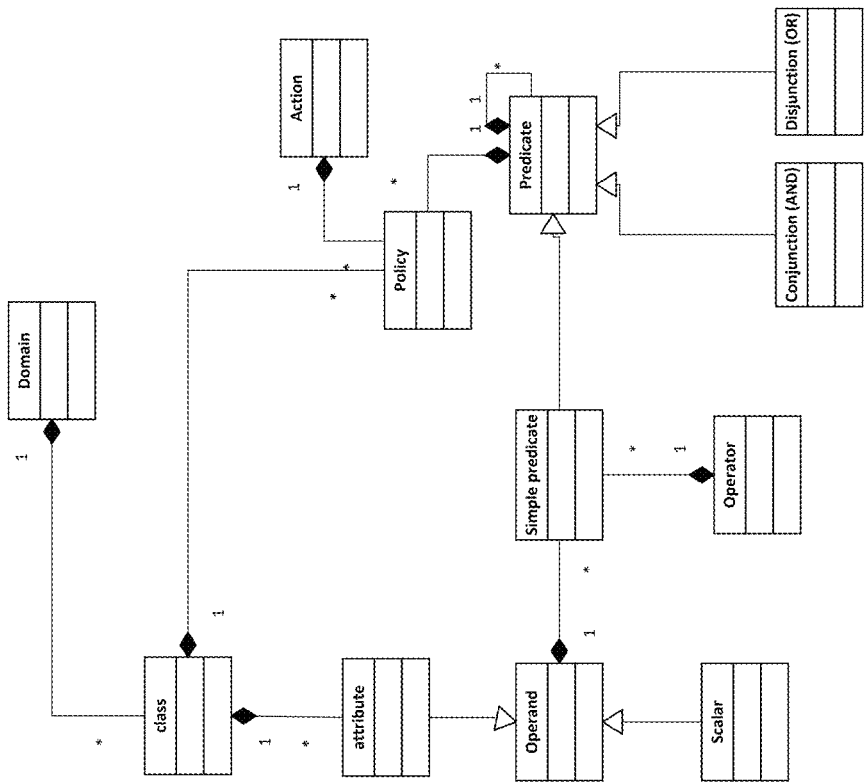
FIG. 6 is a diagram of an information metamodel, according to an exemplary embodiment.

Referring also to FIG. 6, a diagram of an information metamodel within which an information model such as that shown in FIG. 5 can be described is illustrated. In the information metamodel of FIG. 6, the classes of FIG. 5 are shown as belonging to a domain, which represents a bounded set of classes for which a policy is to be defined. For example, for the information model of FIG. 5, the "domain" may be specified as a "Hotel Booking" domain. Attributes are illustrated as belonging to classes, and in this aspect, each attribute belongs to a class, and each class may have many attributes. Referring also to FIG. 7, in order to construct an instance of the metamodel of FIG. 6 from the information model of FIG. 5, the properties of each class are recorded or listed as attributes based on the respective relationship between the property and the class. For example, for the class Hotel, there are two properties that are directly related to the class, which are shown as the attributes "Hotel.name" and "Hotel.id", and there are seven properties of the other three classes that are transitively associated with the Hotel class, including "Hotel.Country.name", "Hotel.Country.id", "Hotel.Employees.name", "Hotel.Employees.id", "Hotel.Bookings.id", "Hotel.Bookings.startDate" and "Hotel.Bookings.endDate".

Referring again to FIG. 4, in step S404, a set of predicate filter functions is defined for the attributes of the classes as identified in step S402. Referring also to FIG. 6, the metamodel also includes a set of simple predicates, which define functional relationships for selecting instances of classes within the information model, within which operands, scalars, and operators are elements that are used to construct the simple predicate. For example, a simple predicate may be an expression of a hotel booking that starts on a specific date, such as 1 Jan. 2018. In this example, the simple predicate may be expressed as follows:

"Bookings.startDate=01/01/2018"

In this example, the operands are the attribute "Bookings.startDate" and the scalar "1/1/18", which represents the 1 Jan. 2018 date, and the operator is the equals sign "=".

As another example, in order to construct a simple predicate that selects hotel bookings for which the hotel is located in the USA or the UK, the simple predicate may include the "Bookings.Hotel.Country.name" attribute and the term ["USA", "UK"] as operands, and the operator may be the word "in" to indicate that the booking is in one of the two countries included in the second operand.

Referring again to FIG. 6, a compound predicate may be generated by performing conjunctions (i.e., "AND" operations) and disjunctions (i.e., "OR") operations on simple predicates. Further to the examples described above, the simple predicate of a hotel booking that starts on 1 Jan. 2018 and the simple predicate of hotel bookings for which the hotel is located in the USA or the UK may be conjunctively combined to form a compound predicate that selects all bookings in either the USA or the UK that began on Jan. 1, 2018 as follows:
Bookings.Hotel.Country.name in ["USA","UK"] AND Bookings.startDate="1/1/2018"

In this manner, the simple predicates may be combined to form compound predicates, which effectively define filters for selecting information as a function of the attributes.

Referring again to FIG. 4, in step S406, a set of access rules is determined based on the filter functions that are defined in step S404. An access rule specifies conditions for which a particular person or entity is allowed access to particular information. For example, an access rule may specify conditions by which a particular employee or group of employees is permitted to access certain hotel booking information. The access rules may include data access rules, which relate to an ability to see particular data types, and functional access rules, which relate to an ability to perform functions/operations on particular data types.

Then, in step S408, a policy is defined with respect to each class based on the access rules determined in step S408. For example, the access rules may define a first policy by which an employee is permitted to see all bookings in the same country as that in which the employee works, and a second policy by which an employee is permitted to update all bookings in the same hotel as that in which the employee works. In this regard, each policy may be derived by using the filter functions from which the access rules are determined.

In step S410, an application programming interface (API) is constructed for the information model, based on the classes and attributes as described above. In an exemplary embodiment, the API is constructed by using a Representational State Transfer (REST) architecture for which there is a well-defined mapping between the resources included in the API and retrieval and/or update of instances of classes included in the information model; however, the present disclosure is not limited thereto, and the API may be constructed by using other types of REST architectures and/or other types of architectures.

In an exemplary embodiment, the API has the following URLs, where <prefix> is a Uniform Resource Locator for the information model as a whole.

prefix/requestedClass—addresses the collections of instances of class <requestedClass> prefix/requestedClass/id—addresses the singleton instance of class <requestedClass> whose identity is <id> prefix/requestedClass/id/association—addresses the collection of entities which is linked through association <association> to the instance of class <requestedClass> whose identity is <id>

Each of the URLs allows the following HTTP verbs:
GET (read) and DELETE (delete) on singleton URLs
GET (read) and POST (create) on collection URLs The REST API serializes objects into JavaScript Object Notation (JSON). API consumers have a mechanism to determine the types of properties and whether or not they are associations. Properties of the base types are serialized directly into JSON. Associations are serialized as strings representing API endpoints. In the case where requestedClass belongs to parentClass, in the serialization of requestedClass/id the association is serialized as "prefix/parentClass/associatedId" or null, where associatedId is the identity of the associated instance (if any) in parentClass. In the case where requestedClass has many childClass the association is represented as "prefix/requestedClass/id/association".

These representations are used for both read and write interactions with the system. Thus, the set of Bookings may be retrieved as a JSON string representation by issuing a HTTP GET on the URL "prefix/Booking", and the hotel with identity 12345 may be created by POSTing a JSON representation of the hotel.

The REST API is augmented with a filter parameter of the form filter=predicate, where predicate may be any predicate as specified above, and the API call retrieves (or modifies) the data elements if and only if they match the predicate. Thus, the API allows retrieval of all bookings in either the USA or the UK that began on Jan. 1, 2018 by issuing a HTTP GET on the URL prefix/Booking?filter=Hotel.Country.name in ["USA","UK"] AND startDate="1/1/2018".

The filter functions determined by the set of predicates effectively constrain access in the information model based on the attributes of the model and the instances that are addressed in the predicates. This predicate syntax is also used to define the policies. In this manner, the API provides an information access control mechanism that reflects the policies as defined by the filter functions.

In an exemplary embodiment, a user may thus issue an API call to request access to data within the information model, and the ACPD device may intercept the API call and introduce the policy to generate another well-formed API call that allows the system to respond in a way which is conformant to the policy. So for example, a user may issue a HTTP GET on the URL prefix/Booking, and the ACPD device may translate that request into the API call prefix/Booking?filter=Hotel.Country.name in ["USA","UK"] AND startDate="1/1/2018" before passing it onto the system for resolution.

In accordance with one or more exemplary embodiments, the API enables and controls access to the information addressed by the model. In addition, because the policies are defined in terms of the information classes and attributes, the policies may be applicable to multiple systems in a manner that is decoupled from the API for a specific system. As a result, a composite policy that is well-defined and durable for an enterprise may be generated. In this regard, by defining the policy as an expression that is based on the information model, the same policy may be projected onto multiple APIs insofar as the policy is based on the same underlying information classes.

In accordance with one or more exemplary embodiments, the methodology for defining policy for controlling access to information resources provides an advantage of an ability to reason about policy coverage, completeness, and correctness over a set of related APIs. In addition, an ability to link a policy definition to an API effectively decouples policy storage and retrieval from policy evaluation. For example, an external policy enforcement point may receive an API request from a user, introduce a policy, and then pass it on to a target system. As a result, a policy decision may be made by a target system without a requirement for an internally persisted policy. This may be especially useful when a policy is externally evaluated for an API resource that retrieves a collection of instances, because instead of retrieving every resource in that collection before applying the newly introduced policy, the policy may be provided as an expression through the API for self-resolution by the system.

In an exemplary embodiment, because simple predicates in the policy are well-formed with respect to the information model, the simple predicates may be substituted with concrete value sets from the information model. As a result, there is an ability to perform partial evaluation of the policy against multiple systems and substitutions of resulting value sets before the policy is introduced to the active system for final resolution. Therefore, incremental evaluation of an enterprise-wide policy may be performed without a requirement for a centralized policy decision engine to access all relevant attributes.

Conversely, in some instances, an API may provide a filter predicate for evaluation, in lieu of a result set. As a result, constraints that may relate to subsequent requests may be expressed. In particular, such constraints may be incorporated into user interfaces in order to eliminate false choices in drop-down lists contained in the user interfaces.

Accordingly, with this technology, an optimized process for defining a policy for controlling access to a system is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure.

Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for defining a policy for controlling access to a system, the method being implemented by at least one processor, the method comprising:
   identifying, by the at least one processor, for each of a plurality of information classes within an information model, at least one respective information attribute;
   defining, by the at least one processor, for at least one of the at least one respective information attribute, a respective predicate filter function;
   determining, by the at least one processor, based on the defined at least one respective predicate filter function, at least one access rule that relates to a corresponding information attribute;
   defining, by the at least one processor, the policy with respect to each of the plurality of information classes based on each of the determined at least one access rule; and constructing, by the at least one processor, a first application programming interface (API) for a first system that relates to the information model based on the defined policy,
wherein the constructing the first API comprises using a Representational State Transfer (REST) architecture that includes a mapping between each of a plurality of elements included in the first API and at least one corresponding class of the plurality of information classes included in the information model.

2. The method of claim 1, wherein the determining of the at least one access rule comprises combining at least two of the at least one respective predicate filter function into a single compound filter for the corresponding information attribute, and determining the at least one access rule based on the single compound filter.

3. The method of claim 1, further comprising:
augmenting the first API by updating at least one filter function based on the defined policy.

4. The method of claim 1, further comprising:
intercepting a first API call against the first system that relates to the information model;
constructing, based on the intercepted first API call, a second API call that includes the defined policy; and
executing the second API call.

5. The method of claim 1, wherein each of the least one respective information attribute includes data that has a respective data type selected from among a plurality of data types that includes a text string type, a numeric type, and a date type.

6. The method of claim 1, wherein the at least one access rule includes at least one from among a data access rule that relates to an ability of a first party to access first data from within the first system and a functional access rule that relates to an ability of the first party to perform a first operation with respect to the first data.

7. The method of claim 1, further comprising modifying at least a second API for a second system that relates to the information model by applying the defined policy to the at least second API.

8. The method of claim 7, further comprising:
receiving, from a user, an input that relates to the defined policy;
adjusting the defined policy based on the received input; and
modifying each of the first API and the at least second API based on the adjusted policy.

9. The method of claim 1, further comprising expressing the information model as a Unified Modeling Language (UML) diagram that is displayable on a display.

10. A computing apparatus for defining a policy for controlling access to a system, the computing apparatus comprising:
a processor;
a memory; and
a communication interface coupled to each of the processor and the memory,
wherein the processor is configured to:
identify, for each of a plurality of information classes within an information model, at least one respective information attribute;
define, for at least one of the at least one respective information attribute, a respective predicate filter function;
determine, based on the defined at least one respective predicate filter function, at least one access rule that relates to a corresponding information attribute;
define the policy with respect to each of the plurality of information classes based on each of the determined at least one access rule; and
construct a first application programming interface (API) for a first system that relates to the information model based on the defined policy,
wherein the processor is further configured to construct the first API by using a Representational State Transfer (REST) architecture that includes a mapping between each of a plurality of elements included in the first API and at least one corresponding class of the plurality of information classes included in the information model.

11. The computing apparatus of claim 10, wherein the processor is further configured to combine at least two of the at least one respective predicate filter function into a single compound filter for the corresponding information attribute, and to determine the at least one access rule based on the single compound filter.

12. The computing apparatus of claim 10, wherein the processor is further configured to augment the first API by updating at least one filter function based on the defined policy.

13. The computing apparatus of claim 10, wherein the processor is further configured to:
intercept a first API call against the first system that relates to the information model;
construct, based on the intercepted first API call, a second API call that includes the defined policy; and
execute the second API call.

14. The computing apparatus of claim 10, wherein each of the least one respective information attribute includes data that has a respective data type selected from among a plurality of data types that includes a text string type, a numeric type, and a date type.

15. The computing apparatus of claim 10, wherein the at least one access rule includes at least one from among a data access rule that relates to an ability of a first party to access first data from within the first system and a functional access rule that relates to an ability of the first party to perform a first operation with respect to the first data.

16. The computing apparatus of claim 10, wherein the processor is further configured to modify at least a second API for a second system that relates to the information model by applying the defined policy to the at least second API.

17. The computing apparatus of claim 16, wherein the processor is further configured to:
receive, from a user via the communication interface, an input that relates to the defined policy;
adjust the defined policy based on the received input; and
modify each of the first API and the at least second API based on the adjusted policy.

18. The computing apparatus of claim 10, wherein the processor is further configured to express the information model as a Unified Modeling Language (UML) diagram that is displayable on a display.

* * * * *